United States Patent Office 3,279,982
Patented Oct. 18, 1966

3,279,982
FUNGICIDAL MIXTURE OF THIURAM SULFIDES AND OXIDIZING AGENT
Lester A. Brooks and Robert T. O'Shaughnessy, East Norwalk, Conn., assignors to R. T. Vanderbilt Company, Inc., New York, N.Y., a corporation of New York
No Drawing. Filed Oct. 19, 1964, Ser. No. 404,942
5 Claims. (Cl. 167—22)

This invention relates to a novel composition and a novel process useful for inhibiting the growth of fungi, particularly on living plants, seeds, and foliage or in soil.

The use of tetramethylthiuram monosulfide is reported in the literature to have fungicidal properties against certain specific types of fungi. However, it is less effective than many other types of fungicides and it may be for this reason that it has not been used extensively on a commercial scale.

One object of the present invention is to improve the effectiveness of tetramethylthiuram monosulfide as a fungicide.

It has now been discovered in accordance with the present invention that tetramethylthiuram monosulfide mixed with an alkali metal nitrite can be applied to plants to produce an enhanced fungicidal effect greater than the sum of the effects of tetramethylthiuram monosulfide and the nitrite itself. The mechanism of this enhanced fungicidal action is not shown. There is essentially no chemical reaction in the absence of sunlight. It may be that in the presence of sunlight, moisture and carbon dioxide of the atmosphere, the nitrite reacts with tetramethylthiuram monosulfide to oxidize it and form dimethylcarbamoyldimethylthiocarbamoyl disulfide in situ,

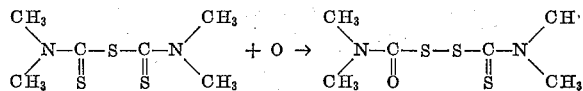

On the other hand it may be that there is a series of oxidation reactions and products formed, each of the successive oxidation products exerting its own separate fungicidal effect, thus giving an increased fungicidal activity and longer lasting activity than can be realized from tetramethylthiuram monosulfide per se or from dimethylcarbamoyldimethylthiocarbamoyl disulfide per se.

It is one of the objects of this invention to provide a highly fungicidal derivative of tetramethylthiuram monosulfide for agricultural use. Another object of the invention is to provide an enhanced fungicidal effect by providing components which the natural action of sunlight and atmospheric oxygen, moisture and carbon dioxide transform gradually into a series of fungicidal compounds each exerting its own effect. Still another object is to provide an economical combination of components which is transformed by naturally occurring conditions into an efficient fungicide without resorting to expensive manufacturing processes.

The amount of alkali metal nitrite used is a minor proportion relative to the tetramethylthiuram monosulfide, thus about 10 parts by weight of tetramethylthiuram monosulfide to 1–3 parts by weight of nitrite represent the preferred range of proportions. The preferred nitrite salt is sodium nitrite because it is less expensive and it is found to be quite effective.

The fungicidal compositions of the invention are free-flowing powders which may be formulated with finely powdered insoluble solids and with wetting and dispersing agents as wettable powders suitable for mixing into aqueous sprays, or as dust suitable for seed treatment, soil application, and for dry application to foliage. Suitable powders for use as diluents include the natural clays such as kaolin, pyrophyllite, attapulgiate, bentonite, diatomaceous earth, talc, calcium carbonate, magnesium carbonate, and flours such as walnut shell, wood and cottonseed flour.

Wetting agents and surface active agents to aid in wetting and dispersing the insoluble tetramethylthiuram monosulfide and powdered diluents for preparation of fungicidal sprays are well known in the art. They include soap, alkali metal salts or sulfonated castor oil or sulfonated olive oil, sulfonated butyl ester of fatty acid, sodium oleyl isethionate, diamyl sodium sulfosuccinate, sulfonated butylamide of coconut fatty acids, sodium oleyl methyl tauride, sodium lauryl sulfate and sodium myristyl sulfate, sodium heptadecyl sulfonate, sodium octyl tripolyphosphate, sodium naphthalene monosulfonate, naphthalene sulfonic acid formaldehyde condensate, alkaryl sulfonates, octadecenyl sulfonate, cellulose sulfite liquor, condensation product of oleyl alcohol with 20 moles ethylene oxide, polyethylene oxide condensation product with lauryl alcohol, ethylene oxide condensation products with fatty amines or amides, e.g., Armour Ethomides, diethanolamine fatty acid condensate and ethylene oxide alkylphenol condensate.

In this connection reference is also made to Bulletin E-607 of the Bureau of Entomology and Plant Quarantine of the United States Department of Agriculture.

Wettable powder formulations suitable for preparation of fungicidal sprays contain 50 to 90% by weight of the tetramethylthiuram monosulfide-nitrite mixture, 0 to 48.5% of a powdered solid diluent or carrier, 1 to 5% by weight of a dispersing agent and 0.5 to 5% by weight of a wetting agent. These components may be blended in a ribbon blender or other suitable mixer. In order to provide adequate surface of contact they are preferably of a particle size not greater than 50 microns and are preferably 3 microns or smaller. If necessary, they may be ground to the desired particle size.

The wettable powders may be slurried with water before diluting in the spray tank, or they may be added directly to the tank and mixed with the circulating pump in the tank. They may be applied at once to foliage or to the seeded soil. The finely divided particles of tetramethylthiuram monosulfide do not clog spray nozzles and there is no significant problem of corrosion of the equipment.

The following examples serve to illustrate the invention but are not intended to impose any limitation on its scope.

*Example 1*

Tests on the fungicide of the invention against early blight of potatoes (*Alternaria solani*) and late blight of potatoes (*Phytophthora infestans*) were carried out in Florida. A formulation containing 92% active fungicide was prepared as follows:

| Component: | Parts by weight |
|---|---|
| Fungicide | 92 |
| McNamee brand soft clay | 5 |
| Darvan No. 1 [1] brand dispersing agent | 5 |
| Ultrawet K [2] brand wetting agent | 1 |

[1] Sodium salt of polymerized alkyl aryl sulfonic acid.
[2] Alkyl benzene sodium sulfonate.

Two proportions of tetramethylthiuram monosulfide with sodium nitrite were tested and they were compared with tetramethylthiuram monosulfide per se. Duplicate plots were sprayed with each of the test compositions, using 2 pounds of 92% active tetramethylthiuram monosulfide per 100 gallons of spray. Each plot was sprayed ten times during the growing season, five times between October 31 and November 30, using 175 gallons per acre, and five times between November 30 and December 31, using 250 gallons per acre. Duplicate plots were left unsprayed to serve as untreated controls. Results of these tests are tabulated below as averages of the duplicate plots. Percent defoliation and yield are reported as of January 14.

| Test No. | Proportions in Test Fungicide, Parts | | Defoliation,[1] percent | Yield, lbs. |
| --- | --- | --- | --- | --- |
| | Tetramethyl- thiuram Monosulfide | Sodium Nitrite | | |
| 1 | 10 | 0 | 25 | 157 |
| 2 | 10 | 1 | 27.5 | 158 |
| 3 | 10 | 3 | 20 | 159 |
| 4 | [2] 0 | 0 | 42.5 | 152 |

[1] Most of the defoliation was caused by early blight.
[2] Untreated control.

These data show that tetramethylthiuram monosulfide plus sodium nitrite at 10:3 proportion was the best treatment both with respect to yield and defoliation.

Example 2

Additional Florida field trials using ratios of tetramethylthiuram monosulfide to sodium nitrite of 10 to 1, 2, 3, 4 and 5 compared with tetramethylthiuram monosulfide per se, with sodium nitrite per se and untreated controls were made during the first few months of the year. All of the fungicides were applied in the amount of 2 pounds of 92% active tetramethylthiuram monosulfide per 100 gallons except for sodium nitrite. Five applications were made in March at the rate of 175 gallons per acre and five in April at 250 gallons per acre. There was no evidence of phytotoxicity. The average yield and the percent defoliation of duplicate plots are summarized below.

| Test No. | Proportions in Test Fungicide, Parts | | Defoliation, percent | Yield, lbs. |
| --- | --- | --- | --- | --- |
| | Tetramethyl- thiuram Monosulfide | Sodium Nitrite | | |
| 1 | 10 | 0 | 80 | 261 |
| 2 | 10 | 1 | 72.5 | 267 |
| 3 | 10 | 2 | 75 | 263 |
| 4 | 10 | 3 | 77.5 | 269 |
| 5 | 10 | 4 | 82.5 | 260 |
| 6 | 10 | 5 | 90 | 245 |
| 7 | 0 | ([1]) | 92.5 | 227 |
| 8 | [2] 0 | 0 | 100 | 255 |

[1] 0.6 lb./100 gal.
[2] Untreated control.

These data show that tetramethylthiuram monosulfide with sodium nitrite in the proportions of 10:1, 10:2 and 10:3 protects potatoes from natural infections of early and late blight better than tetramethylthiuram monosulfide alone both as to yield and defoliation. A higher proportion of sodium nitrite offers less protection according to both criteria. Sodium nitrite at 0.6 pound per gallon which corresponds approximately to the concentration of sodium nitrite in the 10/5 formulation (Test No. 6) reduced the yield 10% below that of the untreated control, showing that sodium nitrite exerts no fungicidal effect (not even a fertilizing effect) of its own.

We claim:
1. An agricultural fungicidal composition comprising tetramethylthiuram monosulfide and an alkali metal nitrite salt of the group consisting of sodium nitrite and potassium nitrite, the amount of tetramethylthiuram monosulfide and nitrite salt being sufficient to impart fungicidal properties to the composition and the amount of nitrite salt being about one to three parts by weight per ten parts by weight tetramethylthiuram monosulfide.

2. A composition as described in claim 1 in which the nitrite salt is sodium nitrite.

3. A fungicidal wettable powder composition comprising tetramethylthiuram monosulfide, an alkali metal nitrite salt of the group consisting of sodium nitrite and potassium nitrite, and a carrier, the amounts of tetramethylthiuram monosulfide and nitrite salt being sufficient to impart fungicidal properties to the composition and the amount of nitrite salt being about one to three parts by weight per ten parts of tetramethylthiuram monosulfide.

4. A composition as described in claim 3 in which the nitrite salt is sodium nitrite.

5. The process for destroying fungi in the field, in the soil and on vegetation which comprises applying to the locus to be protected a mixture of tetramethylthiuram monosulfide and an alkali metal nitrite salt of the group consisting of sodium nitrite and potassium nitrite, the amount of tetramethylthiuram monosulfide and nitrite salt being sufficient to impart fungicidal properties to the composition and the amount of nitrite salt being about one to three parts by weight per ten parts by weight of tetramethylthiuram monosulfide.

References Cited by the Examiner

UNITED STATES PATENTS 1,983,031  12/1934  Himebaugh _____ 167—14

FOREIGN PATENTS 120,227  8/1945  Austria.
675,223  12/1963  Canada.

JULIAN S. LEVITT, *Primary Examiner.*

SAM ROSEN, *Examiner.*

STANLEY J. FRIEDMAN, *Assistant Examiner.*